United States Patent [19]

Ilenda et al.

[11] Patent Number: 5,300,570
[45] Date of Patent: Apr. 5, 1994

[54] PLASTIC ARTICLES WITH COMPATIBILIZED BARRIER RESIN

[75] Inventors: Casmir S. Ilenda, Hulmevill, Pa.; Thomas M. Frantz, Claymont, Del.; William T. Freed, Stockton, N.J.

[73] Assignee: Rohm and Haas Company, Philadelphia, Pa.

[21] Appl. No.: 912,080

[22] Filed: Jul. 8, 1992

Related U.S. Application Data

[60] Continuation of Ser. No. 687,642, Apr. 19, 1991, abandoned, which is a division of Ser. No. 413,943, Sep. 28, 1989, Pat. No. 5,035,933, which is a continuation-in-part of Ser. No. 315,501, Mar. 1, 1989, Pat. No. 4,957,974.

[51] Int. Cl.$^5$ .................... B65D 25/00; B32B 27/08; C08L 31/02
[52] U.S. Cl. .................... 525/80; 525/309; 428/36.6; 428/36.92; 428/522; 428/523
[58] Field of Search .................... 525/309, 80; 428/36.6, 428/36.7, 36.92, 516, 518, 520, 522, 35.7, 500, 523; 215/12.1, 12.2

[56] References Cited

U.S. PATENT DOCUMENTS

| | | | |
|---|---|---|---|
| 2,987,501 | 6/1961 | Rieke et al. | 525/309 |
| 3,641,207 | 2/1972 | Lauchlan | 525/68 |
| 3,652,730 | 3/1972 | Favie et al. | 525/259 |
| 3,862,265 | 1/1975 | Steinkemp et al. | 525/285 |
| 3,886,227 | 5/1975 | VanBrederode et al. | 525/74 |
| 3,975,463 | 8/1976 | Hirata et al. | 525/57 |
| 4,094,927 | 6/1978 | Harrop et al. | 525/210 |
| 4,161,452 | 7/1979 | Stambaugh et al. | 252/34 |
| 4,241,197 | 12/1980 | Steffan et al. | 525/309 |
| 4,329,267 | 5/1982 | Riebel | 523/323 |
| 4,370,450 | 1/1983 | Grigo et al. | 525/262 |
| 4,409,345 | 10/1983 | Moteki et al. | 524/13 |
| 4,426,493 | 1/1984 | Falk | 525/84 |
| 4,511,610 | 4/1985 | Yazaki et al. | 428/516 |
| 4,536,545 | 8/1985 | Olener et al. | 525/75 |
| 4,595,726 | 6/1986 | Klosiewicz | 525/71 |
| 4,624,992 | 11/1986 | Milani et al. | 525/257 |
| 4,664,984 | 5/1987 | Klosiewicz | 428/518 |
| 4,705,708 | 11/1987 | Briggs et al. | 428/516 |
| 5,035,933 | 7/1991 | Ilenda et al. | 428/36.6 |

FOREIGN PATENT DOCUMENTS

| | | |
|---|---|---|
| 234314 | 10/1959 | Argentina . |
| 33220 | 8/1981 | European Pat. Off. . |
| 157655 | 10/1985 | European Pat. Off. . |
| 239685 | 10/1987 | European Pat. Off. . |
| 2559774 | 8/1985 | France . |
| 46-42622 | 12/1971 | Japan . |
| 59-164347 | 9/1984 | Japan . |
| 62-86040 | 4/1987 | Japan . |
| 62-223250 | 10/1987 | Japan . |
| 8206440 | 6/1983 | South Africa . |
| 927519 | 5/1963 | United Kingdom . |
| 1156235 | 6/1969 | United Kingdom . |
| 1251542 | 10/1971 | United Kingdom . |
| 1563946 | 4/1980 | United Kingdom . |

OTHER PUBLICATIONS

J. K. Kallitsis, et al., Eur. Polym J. vol. 23(2), pp. 117–124 (1987).
B. Boutevin, et al; Angew. Makromolekulare Chem. 612, 175(1988).

Primary Examiner—Ellis P. Robinson
Assistant Examiner—Rena L. Dye
Attorney, Agent, or Firm—Darryl P. Frickey; Terence P. Strobaugh

[57] ABSTRACT

This invention provides an improved adhesive layer for multi-layer films and bottles, the adhesive layer being a graft copolymer of a polyolefin backbone with a methyl methacrylate graft. The graft copolymer sufficiently improves the compatibility between barrier resins and polyolefins to permit the production of monolithic or single layer bottles comprised of a blend of those three components. The resultant products have improved physical properties while retaining acceptable permeability to gases.

1 Claim, No Drawings

PLASTIC ARTICLES WITH COMPATIBILIZED BARRIER RESIN

This application is a continuation of application Ser. No. 687,642, filed Apr. 19, 1991 now abandoned which is a divisional of application Ser. No. 413,943, filed Sep. 28, 1989, is now U.S. Pat. No. 5,035,933, which is a continuation-in-part of U.S. Ser. No. 07/315,501, now U.S. Pat. No. 4,957,974, filed Mar. 1, 1989, the disclosure of which is incorporated by reference herein.

BACKGROUND OF THE INVENTION

1. Field of the Invention

This invention pertains to improved extruded and molded articles, to films, bottles, and the like with improved impact strength and reduced oxygen permeability as a result of the incorporation of a compatibilized barrier resin into such articles, and to methods of preparing such articles.

2. Description of Related Art

The polyolefins combine advantageous properties both technically and commercially. Polypropylene, for example, exhibits greater hardness and stiffness than polyethylene, lower brittleness than standard polystyrene, outstanding resistance to hot water and to chemicals, and very good electrical properties. Thus, the polyolefins and their copolymers have a wide range of applications in the form of containers, moldings, profiles, tubes, films, fibrillated filaments and textile fibers.

Formed polyolefin articles may be prepared by injection or blow-molding. In particular, stretch blow-molding is a mass production process for plastic bottles replacing the glass variety. These are used for oil, wine, spirits, milk, still and $CO_2$-containing mineral water, soft drinks and beer. Although the polyolefins possess many desirable properties, as enumerated above, in the particular applications of containers and packaging films, it is desirable to reduce the gas permeability below that normally exhibited by polyolefin films and bottles.

Typically, an extruded film or blown bottle will be comprised of several layers of different polymers, arranged to exploit desirable properties and compensate for detrimental properties. For example, polypropylene offers structural integrity, but is permeable to many gases. A layer of a gas barrier resin, such as a nitrile barrier resin, will reduce the permeability to acceptable levels, even though the barrier resin itself may have undesirable properties, such as sensitivity to liquids. The barrier resin may be sandwiched between layers of the structural polyolefin to isolate the resin, while obtaining the advantages offered by the barrier. In particular, copolymers of ethylene with vinyl alcohol (EVOH) are used in the co-extrusion of packaging materials on account of the outstanding barrier properties against oxygen, nitrogen, carbon dioxide and fragrances imparted by the EVOH. Other polymers, such as poly(-vinylidene chloride) (PVDC) may be used as the barrier resin. The selection of barrier resin is well within the purview of the skilled artisan and is not limited to EVOH and PVDC.

One means for the preparation of such desirable packaging materials, such as films and bottles, is the co-extrusion of an outer layer of polyolefin, a layer of barrier resin, and an inner layer of polyolefin.

However, the adhesion between the polyolefin and barrier layers is generally considered to be inadequate for most uses. Therefore, it is necessary to use an adhesive or tie layer between the polyolefin and the barrier layers in order to ensure sufficient mechanical strength to prevent delamination. Typical adhesive materials are copolymers of ethylene, such as Plexar (Quantum Chemical, USI Division).

A representative five-layer bottle may then have an outer polypropylene layer, an adhesive layer, an EVOH barrier layer, a second adhesive layer, and an internal polypropylene layer. Typically, the percentage of adhesive will be about 10% by thickness. A representative construction is approximately 14 mil polypropylene, 1.5 mil adhesive, 4 mil EVOH, 1.5 mil adhesive, and 14 mil polypropylene.

In extrusion blow-molding of bottles of this type, excess material must usually be removed from the finished product. This "scrap" will contain polypropylene, EVOH, and adhesive. For practical purposes, it is desirable to co-extrude this scrap layer with virgin polypropylene, adhesive, and barrier resin forming a six-layer container in which the scrap layer is sandwiched between the outer polypropylene layer and the first tie layer. In this way, the losses attributable to scrap are significantly reduced. This co-extrusion, however, often leads to significant problems with delamination and product quality.

Since it is a critical element of these constructions to have the barrier layer, it is also important that the barrier layer be one which is state-of-the-art in terms of its properties. Although EVOH is a widely used and highly regarded material, it suffers from the deficiency of being susceptible to water. The presence of the polypropylene protects it from water. However, in the construction of these bottles and films, it is still necessary to use the adhesive. The adhesive material adds increased cost and raises significant questions of processibility. It, therefore, is desirable to identify additional adhesive materials which will provide a better balance of properties than that currently available at improved processing efficiencies.

SUMMARY OF THE INVENTION

This invention provides an improved adhesive layer for multi-layer films and bottles, the adhesive layer being a graft copolymer of a polyolefin backbone with a methyl methacrylate graft. In addition, it has been discovered that the graft copolymer sufficiently improves the compatibility between barrier resins and polyolefins to permit the production of monolithic or single layer bottles comprised of a blend of those three components. The resultant products have improved physical properties while retaining acceptable permeability to gases.

DETAILED DESCRIPTION OF THE INVENTION

The graft copolymer which serves as the adhesive or compatibilizing resin for this invention is disclosed in U.S. Ser. No. 07/315,501, filed Mar. 1, 1989, of common ownership with this application. The disclosure of the aforementioned application is incorporated by reference herein.

The graft polymer is derived from at least about 80% of a monomer of a methacrylic ester of the formula $CH_2=C(CH_3)COOR$, where R may be alkyl, aryl, substituted or unsubstituted, and less an 20% based on the total monomer weight, of an acrylic or styrenic monomer copolymerizable with the methacrylic ester. This is accomplished by adding the methacrylate monomers to a solution of the polyolefin together with an initiator which generates a constant, low radical concentration, or radical "flux", at the solution temperature. These radicals initiate polymerization of the monomer and cause formation of a covalent bond with the trunk.

The molecular weight of the polyolefin polymer which forms the trunk of the graft copolymer should be high enough to give a large amount of non-polar polymer when grafted, but low enough so that most of the graft copolymer has one acrylic polymer chain grafted to each polyolefin trunk chain. The trunk may have a molecular weight between about 50,000 and 1,000,000. The trunk may also have a molecular weight of about 100,000 to 400,000. A polyolefin trunk having a molecular weight of about 200,000–800,000 Mw is especially preferred, but polyolefins having the molecular weight of about 50,000–200,000 can be used with some beneficial effect.

The preferred monomer is methyl methacrylate. As much as 100% of this, or of other 2 to 4 carbon alkyl methacrylates, can be used. Up to 20% of high alkyl, such as dodecyl and the like, aryl, such as phenyl and the like, alkaryl, and such as benzyl and the like, and/or cycloalkyl, such as cyclohexyl and the like, methacrylates can be used. In addition, up to 20% (preferably less than 10%) of the following monomers can be incorporated with the methacrylate esters which form the major portion of the monomer: methacrylic acid, methacrylamide, hydroxyethyl methacrylate, hydroxpropyl methacrylate, alkoxyalkyl methacrylates, such as ethoxyethyl methacrylate and the like, alkylthioalkyl methacrylates, such as ethylthioethyl methacrylate and the like, methacrylamide, t-butylaminoethyl methacrylate, dimethylaminoethyl methacrylate, dimethylaminopropyl methacrylamide, glycidyl methacrylate, methacryloxypropyltriethoxysilane, acrylate monomers (such as ethyl acrylate, butyl acrylate and the like), styrene, acrylonitrile, acrylamide, acrylic acid, acryloxypropionic acid, vinyl pyridine, and N-vinylpyrrolidone. In addition, as much as 5% of maleic anhydride or itaconic acid may be used. It is important that the chain transfer of the polymerizing chains to its own polymer be minimal relative to transfer with the polyolefin chains for the efficient production of homogenous non-gelled graft polymer in good yield.

The molecular weight of the acrylic graft as measured by the weight average molecular weight of the ungrafted co-prepared acrylic polymer may be about 20,000 to 200,000. The preferred range is 30,000 to 150,000.

The process of graft polymerizing the monomer leads to the production of ungrafted and grafted material. The amount of grafted material is in the range of 5% to 50% of the total acrylic polymer or copolymer produced. The graft copolymer is prepared in a process that polymerizes the monomer in the presence of the non-polar polyolefin. The process is conducted in a solvent which swells or dissolves the non-polar polymer. The solvent is also one that has no or low chain transfer ability. Examples include non-branched and branched aliphatic hydrocarbons, chlorobenzene, benzene, t-butylbenzene, anisole, cyclohexane, naphthas, and dibutyl ether. Preferably, the solvent is easy to remove by extrusion devolatilization, and therefore has a boiling point below 200° C., preferably below about 150° C. to avoid excessive pressure, a boiling point above about 100° C. is also preferred.

The final solids content (which includes polyolefin and acrylic polymer) depends on the viscosity and the ability to mix well. The practical limits are 20% to 70% but the solids content can be as high as is consistent with good mixing for economy. Preferably, the solids content falls in the range of about 35% to about 60%.

A gradual addition or multicharge addition of the monomer is preferred. Optionally, the monomer charge need not be the same throughout, for example, the last 0–20% may contain all of the monomer used in minor amount to concentrate that monomer in one portion of the polymer.

The temperature during the polymerization can be in the range of 110° to 200° C., but the preferred range is 130° to 175° C. Especially preferred is 145° C. to 160° C. The pressure can be atmospheric to superatmospheric, or as high as 2100 kPa or whatever is necessary to keep the reaction mixture in the liquid phase at the polymerization temperature.

The unreacted monomer concentration should be kept low during the reaction. This is controlled by balancing the radical flux and the monomer feed conditions.

This application teaches the preparation of a variety of graft copolymers of polyolefins, in particular polypropylene, with methacrylate side chains. The use of this copolymer in a variety of resin systems has been seen to provide vastly improved compatibility as evidenced by reduced domain sizes in polymeric blends. This application discloses and claims a significant advance in the film- and bottle-making art based upon the use of this novel copolymer as a compatibilizer for known resins.

EXAMPLE 1

Preparation of Acrylic/Polypropylene Graft Copolymer Compatibilizer

A polypropylene-acrylic graft copolymer was made by polymerizing a 5% ethyl acrylate-95% methyl methacrylate monomer mixture in the presence of polypropylene (weight ratio of polypropylene:monomer =0.67:1). Radicals were generated from di-t-butyl peroxide at the rate of 0.000070 moles/liter/minute (radical flux). Monomer and initiator were fed over 120 minutes and the theoretical (100% conversion) solids at the end of the reaction is 50%.

A 100-gallon reactor equipped with a pitched blade turbine agitator was charged with 190 lb. of Isopar E (a mixed aliphatic hydrocarbon solvent) and 76 lb. of polypropylene (Himont 6523, Himont, Inc., Wilmington, Del.). This mix was deoxygenated by applying vacuum to degas, followed by pressurizing with nitrogen to atmospheric pressure for three cycles. Finally, the mix was pressured to 15 psig with nitrogen and heated to 150° C. over 2 hours. A pressure of 35 psig was maintained while the batch was held at 150° C. for 3 hours. Two solutions were added over a 15-minute period. The first consisted of 59 g of di-t-butyl peroxide in 841 g of Isopar E. The second consisted of 0.32 kg of ethyl acrylate and 6.14 kg of methyl methacrylate. An additional 103 g of di-t-butyl peroxide and 1479 g of Isopar E were added over 105 minutes. At the same time, 2.26 kg of ethyl acrylate and 43.0 kg of methyl methacrylate were added over 105 minutes. The reaction exotherm increased the temperature to about 160° C. After the feed was complete, 11 lb. of Isopar E was fed into the reaction mixture.

The reaction mixture was held in the reaction kettle for an additional 30 minutes. It was then transferred to a second kettle, which was also under pressure at 150° C. During the transfer, a solution of 80 g of di-t-dodecyl disulfide in 320 g of Isopar E was added to the second kettle. Also during this transfer, three 10 lb. batches of Isopar E were fed into the reaction kettle. The material in this second kettle was fed to a 0.8 inch twin screw extruder, where devolatilization occurred.

During the devolatilization, the next batch was prepared in a reaction kettle. It was transferred to the extruder feed kettle while extrusion continued. In this way, several batches were made in a "semi-batch" matter, batch-wise in the reactor with continuous feed to the extruder.

Three samples of this material isolated at different times during the extrusion were blended with Himont 6523 polypropylene in a ratio of 4:96, pressed and tested for sag as described in U.S. Ser. No. 07/315,501. All three gave properties within the range of that expected for acceptable material.

A second batch of graft copolymer was prepared in a similar manner, except that the radical flux was 0.000050 (42 g of di-t-butyl peroxide plus 858 g of Isopar E in first feed; 73 g of di-t-butyl peroxide and 1502 g of Isopar E in second feed). Measurements of properties on this batch were also within the expected ranges.

The graft copolymer (GCP) used for the experiments described in the following examples was prepared by blending pellets from thirteen batches prepared in the first run and one batch of material prepared in the second run.

EXAMPLE 2

Preparation of Melt Blends of Polypropylene, EVOH, and Graft Copolymer(GCP)

Polypropylene, EVOH and the graft copolymer of Example 1 were compounded in an intermeshing, co-rotating twin screw extruder (Baker-Perkins, MPC/V 30) with an L/D of 10:1. The compounder was run at 200 rpm with a melt temperature of 205°-225° C. The melt was fed directly to a 38 mm single screw pelletizing extruder with an L/D of 8:1. The melt temperature in the transition zone between the compounding and the pelletizing extruder was 200°-215° C. The melt was stranded through a die, cooled in a water bath, and chopped into pellets. Visual observation indicated that the materials containing graft copolymer were fully compatible. These pellets were then dried and injection molded on a reciprocating screw injection molding machine (New Britain Model 75) into test specimens.

ASTM test methods were used to test the impact strength and tensile properties of the injection-molded parts. The results are summarized in Table 1.

EXAMPLE 3

Preparation of Films from Polypropylene/ EVOH/GCP Blends

Five mil (0.13 mm) films were pressed for determination of permeability. The pellets that had been compounded as described in Example 2 were milled on a 3 inch by 7 inch electric mill at 205° C. for 3 minutes. The hot stock was then placed between preheated plates and pressed at 205° C. in a 100-ton Farrel press for 3 minutes at 2 tons followed by 2 minutes at 20 tons. The plates were transferred to a cool press for 1 minute of cooling at 2 tons pressure.

Oxygen permeation values were determined using a Mocon Ox-Tran 1000 tester (Modern Controls, Inc., Brooklyn Center, Minn.). The films for testing were prepared as 110 mm squares sealed into the unit and swept with nitrogen on both sides to determine a sample baseline and allow the film to equilibrate with nitrogen.

Pure oxygen at 1 atmosphere pressure was then swept over one face of the film for the duration of the test. The nitrogen swept over the opposite face of the film contained 1-2% hydrogen; this gas mixture was conducted from the test chamber through a Coulox nickel cadmium fuel cell detector, where any oxygen present burnt an equivalent amount of the excess hydrogen to generate an electric current proportionate to the amount of oxygen. This current, automatically corrected for the sample baseline, was continuously recorded and used to calculate the oxygen permeability value of the sample.

Test conditions during both equilibration and oxygen testing were 23° C. and 0% relative humidity.

The permeability data are reported in Table 1 in cc.cm/(sq.cm.cm.Hg.sec)xE(*12), where cc is cubic centimeters of oxygen, cm is film thickness in centimeters, sq cm is area of film in square centimeters, cm Hg is pressure in cm of Hg, sec is time in seconds, and E(*12) is 10 to the 12th power.

The addition of 5-15% of the graft copolymer compatibilizer to binary compositions of EVOH and polypropylene improves the compatibility of the polar EVOH and the non-polar olefin polypropylene.

The first three entries in Table 1 indicate that the compatibilizing copolymer does not negatively affect the permeability of EVOH films. Comparison of tests 4 and 5 indicates that the addition of approximately 5% of the GCP compatibilizer almost doubles the unnotched Izod impact strength, without affecting the permeability, and further increases the maximum stress, break strain, and tensile modulus.

When polypropylene is the majority component, it can be seen from test 7 that the oxygen permeability is rather high. The addition of the GCP at approximately 5% in test 8 reduces the permeability by 33% while enhancing the physical properties. Even with the very high percentages of polypropylene in tests 10, 11 and 12, it can be seen that the presence of the compatibilizing additive improves the physical properties.

EXAMPLE 4

Preparation of a Co-extruded Five-layer Bottle Using the Compatibilizing Additive A five-layer bottle was extruded through five separate Battenfeld Fischer extruders. Each extruder is independently controlled. Two molds for continuous extrusion of the parison were present. The materials used were polypropylene (Fortilene 41X11, Soltex), a layer of Plexar 460 adhesive (Quantum Chemical, USI Division), a barrier layer of EVOH (EVAL SC-F101, Eval Corporation of America), a second Plexar adhesive layer, and a final inner polypropylene (Fortilene 41X11) layer.

The polypropylene was extruded at a temperature between 190° and 200° C. The EVOH was extruded at a temperature between 205° and 210° C. In the first trials, Plexar 460 was used as the adhesive and was maintained at a temperature between 200° and 220° C.

An acceptable five-layer bottle was produced in these experiments.

The graft copolymeric compatibilizer(GCP) of Example 1 was substituted for both layers of Plexar 460 and it was determined that a GCP melt temperature of only 172° C. was needed to extrude coherent bottles which would withstand delamination using this new combination.

EXAMPLE 5

Preparation of a Monolithic Bottle from a Blend of Polypropylene, EVOH, and GCP Compatibilizer A monolithic, single-layer bottle was prepared by extrusion blow-molding at about 200° C. of a blend of polypropylene, EVOH, and the compatibilizing additive of Example 1. The actual material used for this experiment was reground scrap from Example 4. Although this bottle was hazier than the traditional layered construction described previously, it was uniform in appearance and also did not have delamination problems. It is expected that this monolithic bottle should be useful in many applications in which permeability, strength, and optical clarity are desired to be between those of polypropylene and a multi-layered barrier construction.

While the invention has been described with reference to specific examples and applications, other modifications and uses for the invention will be apparent to those skilled in the art without departing from the spirit and scope of the invention defined in the following claims.

What is claimed is:

1. A monolayer film with low permeability to gases, comprising a blend of:
   (A) a melt-processible polyolefin;
   (B) a gas barrier resin; and
   (C) a polyolefin-acrylic graft copolymer compatibilizer for the barrier resin and polyolefin;
   in which the graft copolymer compatibilizer comprises:
   (a) a non-polar polyolefin trunk selected from the group consisting of polyethylene, polypropylene, polybutylene, poly(4- methylpentene), copolymers of said olefins with each other, and one or more copolymers of said olefins with minor amounts of 1-alkenes, vinyl esters, vinyl chloride, methacrylic ester, and methacrylic acid, said trunk having a molecular weight of between about 50,000 and about 1,000,000; and
   (b) at least one methacrylate chain grafted with a covalent bond to said trunk, having a weight ratio with said trunk of from about 1:9 to 4:1, said chain being a polymer derived from at least about 80% of a monomer of methacrylic ester of the formula $CH_2=C(CH_3)COOR$, which R is alkyl, aryl, substituted alkyl, substituted aryl, or substituted alkaryl, and less than about 20% of an acrylic or styrenic monomer copolymerizable with the methacrylic ester, said chain having a molecular weight of from about 20,000 to about 200,000.

* * * * *

TABLE 1

PHYSICAL PROPERTIES OF EVOH/ POLYPROPYLENE/GRAFT COPOLYMER BLENDS

| NO. | EVOH/PP/GCP (%) | Maximum Stress (Kpsi) | Tensile Modulus (Kpsi) | Break Strain (%) | Unnotched Izod (ft-lb) | Oxygen Permeability |
|---|---|---|---|---|---|---|
| 1 | 100/0/0 | 8.6 | 479 | 114 | — | 0.05 |
| 2 | 95/0/5 | 8.5 | 466 | 99 | — | 0.08 |
| 3 | 87/0/13 | 8.1 | 454 | 11 | — | 0.05 |
| 4 | 70/30/0 | 5.9 | 380 | 6 | 6.9 | 0.09 |
| 5 | 67/29/5 | 6.8 | 394 | 16 | 13.0 | 0.10 |
| 6 | 61/26/13 | 6.8 | 387 | 8 | 6.7 | 0.12 |
| 7 | 45/55/0 | 4.9 | 324 | 4 | 4.8 | 17.50 |
| 8 | 43/52/5 | 5.8 | 334 | 7 | 6.5 | 11.70 |
| 9 | 39/48/13 | 5.9 | 337 | 8 | 5.7 | — |
| 10 | 20/80/0 | 4.8 | 279 | 10 | 4.8 | 14.91 |
| 11 | 19/76/5 | 5.2 | 296 | 29 | 7.4 | 14.97 |
| 12 | 17/70/13 | 5.4 | 306 | 12 | 8.5 | 13.84 |
| 13 | 0/100/0 | 4.6 | 224 | 100 | 20.0 | 97.50 |
| 14 | 0/95/5 | 4.8 | 248 | 100 | 20.0 | — |
| 15 | 0/87/13 | 4.9 | 262 | 100 | 21.0 | — |